(12) United States Patent
Crain et al.

(10) Patent No.: US 9,625,062 B2
(45) Date of Patent: *Apr. 18, 2017

(54) FUEL SYSTEM COMPONENTS

(76) Inventors: John M. Crain, Washington, DC (US);
John S. Lettow, Washington, DC (US);
Kate Redmond, Baltimore, MD (US)

( * ) Notice: Subject to any disclaimer, the term of this patent is extended or adjusted under 35 U.S.C. 154(b) by 867 days.

This patent is subject to a terminal disclaimer.

(21) Appl. No.: 12/936,676

(22) PCT Filed: Apr. 6, 2009

(86) PCT No.: PCT/US2009/039697
§ 371 (c)(1),
(2), (4) Date: Jan. 27, 2011

(87) PCT Pub. No.: WO2009/126592
PCT Pub. Date: Oct. 15, 2009

(65) Prior Publication Data
US 2011/0114189 A1    May 19, 2011

Related U.S. Application Data

(60) Provisional application No. 61/123,354, filed on Apr. 7, 2008.

(51) Int. Cl.
| | |
|---|---|
| *F16L 11/06* | (2006.01) |
| *B32B 1/02* | (2006.01) |
| *B32B 1/08* | (2006.01) |
| *B32B 25/02* | (2006.01) |
| *B32B 25/04* | (2006.01) |
| *B32B 25/20* | (2006.01) |
| *B32B 27/06* | (2006.01) |
| *B32B 27/18* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |
| *B82Y 30/00* | (2011.01) |

(52) U.S. Cl.
CPC ............... *F16L 11/06* (2013.01); *B32B 1/02* (2013.01); *B32B 1/08* (2013.01); *B32B 25/02* (2013.01); *B32B 25/04* (2013.01); *B32B 25/20* (2013.01); *B32B 27/06* (2013.01); *B32B 27/18* (2013.01); *B32B 27/28* (2013.01); *B32B 27/281* (2013.01); *B32B 27/285* (2013.01); *B32B 27/286* (2013.01); *B32B 27/288* (2013.01); *B32B 27/30* (2013.01); *B32B 27/302* (2013.01); *B32B 27/304* (2013.01); *B32B 27/306* (2013.01); *B32B 27/32* (2013.01); *B32B 27/322* (2013.01); *B32B 27/34* (2013.01); *B32B 27/36* (2013.01); *B32B 27/365* (2013.01); *B32B 27/40* (2013.01); *B82Y 30/00* (2013.01); *B32B 2262/00* (2013.01); *B32B 2262/106* (2013.01); *B32B 2264/00* (2013.01); *B32B 2264/108* (2013.01); *B32B 2270/00* (2013.01); *B32B 2274/00* (2013.01); *B32B 2307/202* (2013.01); *B32B 2307/30* (2013.01); *B32B 2307/302* (2013.01); *B32B 2307/558* (2013.01); *B32B 2307/714* (2013.01); *B32B 2307/718* (2013.01); *B32B 2307/7265* (2013.01); *B32B 2597/00* (2013.01); *B32B 2605/00* (2013.01); *Y10T 137/0318* (2015.04); *Y10T 137/6851* (2015.04); *Y10T 428/1372* (2015.01)

(58) Field of Classification Search
CPC ................... Y10T 137/6851; Y10T 137/7036
USPC ......... 428/35.7, 35.8, 36.4, 36.6, 36.8, 36.9, 428/36.91, 36.92; 137/343, 375
See application file for complete search history.

(56) References Cited

U.S. PATENT DOCUMENTS

| | | | | |
|---|---|---|---|---|
| 6,677,015 | B2 * | 1/2004 | Himmelmann et al. ...... | 428/35.7 |
| 7,071,258 | B1 * | 7/2006 | Jang et al. .................... | 524/496 |
| 8,278,757 | B2 * | 10/2012 | Crain ....................... | H05K 3/12 |
| | | | | 174/257 |
| 8,449,959 | B2 * | 5/2013 | Aksay et al. ................. | 428/35.7 |
| 2005/0205847 | A1 * | 9/2005 | Dailly .................... | B82Y 30/00 |
| | | | | 252/378 R |
| 2007/0092432 | A1 * | 4/2007 | Prud'Homme et al. ...... | 423/448 |
| 2007/0131915 | A1 * | 6/2007 | Stankovich et al. .......... | 252/511 |
| 2012/0244333 | A1 * | 9/2012 | Aksay et al. ................. | 428/221 |

\* cited by examiner

*Primary Examiner* — Kevin Murphy
*Assistant Examiner* — Jonathan Waddy
(74) *Attorney, Agent, or Firm* — Trentice V. Bolar; Kate Redmond

(57) ABSTRACT

Fuel system components comprising polymer compositions containing functionalized graphene sheets. The components are formed from the polymer compositions or are coated with the polymer composition.

19 Claims, No Drawings

FUEL SYSTEM COMPONENTS

This application is a continuation of PCT Patent Application No. PCT/US09/39697, filed Apr. 6, 2009, which claims the benefit of U.S. Provisional Application No. 61/123,354, filed Apr. 7, 2008, and which are herein incorporated by reference in their entirety. The present invention relates to fuel system components comprising polymer compositions containing functionalized graphene sheets. The components may be made directly from the polymer composition or be coated with the polymer composition.

FIELD OF THE INVENTION

Background

The components used in conveying fuel within fuel systems (such as automotive and other vehicular fuel systems) and between fuel systems and storage tanks or the like have traditionally been made from metals, however, it can be desirable to make such components from polymeric materials because of their light weight and ability to be formed into intricate parts. The use of polymeric materials also allows for significant flexibility in part design change, as tooling costs can be lower than for metal systems and mold designs may be easily altered. Polymeric materials can also easily be formed into seamless articles that have lower likelihoods of leaking than articles containing seams. Suitable polymeric materials may have several desirable properties. It is desirable that polymeric fuel system components that are in direct contact with the fuel have good permeation resistance to and do not degrade significantly in the presence of the fuel. It is desirable that components, and in particular, those that are exposed to the environment outside the device being operated using the fuel system (such as a vehicle), have good impact resistance. Additionally, since fuel system components are often exposed to elevated temperatures, as when, for example, they are used in the engine compartment of a vehicle, it is frequently desirable that the polymeric materials retain their properties at elevated temperatures.

Furthermore, since buildup of electrostatic charge on fuel system components can lead to sparking and can create an explosion hazard, the use of static dissipative electrically conductive polymeric materials is often advantageous. In fact, regulations in most countries require vehicular fuel system component to have static dissipative properties. Many components are also exposed to road salt and other materials that can lead to the degradation of the polymers during use, making the use of chemically resistant materials desirable.

It would therefore be desirable to obtain a polymeric material that has a combination of static dissipative properties, fuel permeation resistance, good impact and chemical resistance, and good retention of physical properties at elevated temperatures that can meet the requirements of many fuel system components.

SUMMARY OF THE INVENTION

Disclosed and claimed herein are fuel system components comprising a polymer composition, comprising at least one polymer and functionalized graphene sheets. Further disclosed and claimed herein is a method of providing fuel to a power source, comprising the step of conveying fuel from a storage tank via a path wherein the fuel comes into contact with a fuel system component comprising a polymer composition comprising at least one polymer and functionalized graphene sheets.

DETAILED DESCRIPTION OF THE INVENTION

By "fuel system component" is meant a component of the fuel system used in a piece of equipment or vehicle where the component is in direct contact with liquid or vapor/gaseous fuel, including flowing fuel, stored fuel, and the like, or has a function of providing a path to ground from a component that is in direct contact with flowing fuel. The components may be part of a fuel tank filling system and/or the delivery system that conveys fuel from a vehicle or equipment fuel storage tank to an engine or other power source. The components will preferably be components that have an inner surface that is contact with fuel and at least a portion of the surface that is in contact with fuel may comprise the polymer compositions used in the present invention. The outer surface may be exposed to the exterior of the vehicle or equipment and/or comprises an exterior surface of the vehicle or equipment or may be fully or partially encased in another component of the vehicle or equipment. In an alternative embodiment the fuel system components of the invention provide a path to ground for static electricity but do not typically contact fuel.

The fuel system components may be used in any equipment or vehicle possessing a power source using chemical fuels, such as an internal combustion engine, turbine engine, fuel cell, or the like. Examples of equipment and vehicles include cars, trucks, motorcycles, all-terrain vehicles, lawnmowers, tractors and other farm equipment, construction equipment, marine vehicles (such as power boats and personal watercraft vehicles), snowmobiles, chain saws, garden and landscaping equipment, portable and stationary power generators, aircraft (including helicopters), fuel-powered toys, and the like. The power source may run on any suitable kind of fuel, including gasoline, diesel fuel, biodiesel fuel, jet fuel, alcohols, alcohol-containing fuels (including alcohol-containing gasoline), hydrogen, natural gas, other hydrocarbon gases, and the like.

Preferred components include fuel lines and tubing, fuel tank filler pipes and connectors, fuel line connectors, fuel pumps, fuel pump and delivery module components, fuel injector components, and fuel filter housings. In an alternative embodiment the preferred components may also include fuel line grounding clips, fuel tank flanges, fuel filter clamps, fuel tank caps, and components comprising heat dissipation elements, such as heat sink fins.

The fuel system components comprise polymer compositions comprising at least one polymer and high surface area functionalized graphene sheets (also referred to herein as "FGS" or "graphene sheets"). The bulk of the components may be formed from the polymeric compositions by a process such as molding or extrusion. Alternatively, components whose major component is a material (such another polymer composition) other than a composition comprising graphene sheets and polymer may be coated with a composition comprising graphene sheets and polymer. In another embodiment, a component comprising graphene sheets and polymer can be coated with the same or a different composition comprising graphene sheets and polymer.

Preferred graphene sheets are graphite-based sheets preferably having a surface area of from about 100 to about 2630 $m^2/g$. In some embodiments of the present invention, the graphene sheets primarily, almost completely, or completely comprise fully exfoliated single sheets of graphite (these are approximately 1 nm thick and are often referred to as "graphene"), while in other embodiments, they may comprise at least a portion partially exfoliated graphite sheets, in which two or more sheets of graphite have not been exfoliated from each other. The graphene sheets may comprise mixtures of fully and partially exfoliated graphite sheets.

Graphene sheets may be made using any suitable method. For example, they may be obtained from graphite, graphite oxide, expandable graphite, expanded graphite, etc. They may be obtained by the physical exfoliation of graphite, by for example, peeling off sheets graphene sheets. They may be made from inorganic precursors, such as silicon carbide. They may be made by chemical vapor deposition (such as by reacting a methane and hydrogen on a metal surface). They may be may by the reduction of an alcohol, such ethanol, with a metal (such as an alkali metal like sodium) and the subsequent pyrolysis of the alkoxide product (such a method is reported in *Nature Nanotechnology* (2009), 4, 30-33). They may be made by the exfoliation of graphite in dispersions or exfoliation of graphite oxide in dispersions and the subsequently reducing the exfoliated graphite oxide. Graphene sheets may be made by the exfoliation of expandable graphite, followed by intercalation, and ultrasonication or other means of separating the intercalated sheets (see, for example, *Nature Nanotechnology* (2008), 3, 538-542). They may be made by the intercalation of graphite and the subsequent exfoliation of the product in suspension, thermally, etc.

Graphene sheets may be made from graphite oxide (also known as graphitic acid or graphene oxide). Graphite may be treated with oxidizing and/or intercalating agents and exfoliated. Graphite may also be treated with intercalating agents and electrochemically oxidized and exfoliated. Graphene sheets may be formed by ultrasonically exfoliating suspensions of graphite and/or graphite oxide in a liquid (which may contain surfactants and/or intercalants). Exfoliated graphite oxide dispersions or suspensions can be subsequently reduced to graphene sheets. Graphene sheets may also be formed by mechanical treatment (such as grinding or milling) to exfoliate graphite or graphite oxide (which would subsequently be reduced to graphene sheets).

Reduction of graphite oxide to graphene sheets may be by means of chemical reduction and may be carried out on graphite oxide in a solid form, in a dispersion, etc. Examples of useful chemical reducing agents include, but are not limited to, hydrazines (such as hydrazine, N,N-dimethylhydrazine, etc.), sodium borohydride, hydroquinone, citric acid, isocyanates (such as phenyl isocyanate), hydrogen, hydrogen plasma, etc. For example, a dispersion of exfoliated graphite oxide in a carrier (such as water, organic solvents, or a mixture of solvents) can be made using any suitable method (such as ultrasonication and/or mechanical grinding or milling) and reduced to graphene sheets.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, etc. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. A preferred intercalation agent includes sulfuric acid. Graphite may also be treated with intercalating agents and electrochemically oxidized. Examples of methods of making graphite oxide include those described by Staudenmaier (*Ber. Stsch. Chem. Ges.* (1898), 31, 1481) and Hummers (*J. Am. Chem. Soc.* (1958), 80, 1339).

One example of a method for the preparation of graphene sheets is to oxidize graphite to graphite oxide, which is then thermally exfoliated to form graphene sheets (also known as thermally exfoliated graphite oxide), as described in U.S. 2007/0092432, the disclosure of which is hereby incorporated herein by reference. The thusly formed graphene sheets may display little or no signature corresponding to graphite or graphite oxide in their X-ray diffraction pattern.

Examples of temperatures at which the thermal exfoliation of graphite oxide may be carried out are at least about 300° C., least about 400° C., least about 450° C., least about 500° C., least about 600° C., least about 700° C., least about 800° C., least about 850° C., least about 900° C., least about 950° C., and least about 1000° C. Preferred ranges include between about 750 about and 3000° C., between about 850 and 2500° C., and between about 950 and about 2500° C.

The time of heating can range from less than a second to many minutes. In one example, the time of heating is less than about 10 seconds. In another, the time of heating is at least about 2 minutes, or more preferably at least about 5 minutes. The heating times be at least about 15 minutes, or about 30 minutes, or about 45 minutes, or about 60 minutes, or about 90 minutes, or about 120 minutes, or about 150 minutes. During the course of heating, the temperature may vary. Examples of the rate of heating include at least about 120° C./min, at least about 200° C./min, at least about 300° C./min, at least about 400° C./min, at least about 600° C./min, at least about 800° C./min, at least about 1000° C./min, at least about 1200° C./min, at least about 1500° C./min, at least about 1800° C./min, and at least about 2000° C./min.

The thermal exfoliation may be carried out in a continuous, semi-continuous batch, etc. process.

The graphene sheets preferably have a surface area of at least about 100 $m^2$/g to, or of at least about 200 $m^2$/g, or of at least about 300 $m^2$/g, or of least about 350 $m^2$/g, or of least about 400 $m^2$/g, or of least about 500 $m^2$/g, or of least about 600 $m^2$/g, or of least about 700 $m^2$/g, or of least about 800 $m^2$/g, or of least about 900 $m^2$/g, or of least about 700 $m^2$/g. The surface area may be about 400 to about 1100 $m^2$/g. The theoretical maximum surface area can be calculated to be. The surface area includes all values and subvalues therebetween, especially including 400, 500, 600, 700, 800, 900, 1000, 1100, 1200, 1300, 1400, 1500, 1600, 1700, 1800, 1900, 2000, 2100, 2200, 2300, 2400, 2500, and 2630 $m^2$/g.

The graphene sheets preferably have number average aspect ratios of about 100 to 100,000 (where "aspect ratio" is defined as the ratio of the longest dimension of the sheet to the shortest).

Surface area can be measured using either the nitrogen adsorption/BET method at 77 K or a methylene blue (MB) dye method in liquid solution. The BET method is preferred.

The dye method is carried out as follows: A known amount of graphene sheets is added to a flask. At least 1.5 g of MB are then added to the flask per gram of graphene sheets. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets are then calculated using a value of 2.54 m$^2$ of surface covered per one mg of MB adsorbed.

The graphene sheets may have a bulk density of from about 0.1 to at least about 200 kg/m$^3$. The bulk density includes all values and subvalues therebetween, especially including 0.5, 1, 5, 10, 15, 20, 25, 30, 35, 50, 75, 100, 125, 150, and 175 kg/m$^3$.

The graphene sheets may be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1. In some embodiments of the invention, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least about 500:1, or at least about 750:1, or at least about 1000:1; or at least about 1500:1, or at least about 2000:1. The carbon to oxygen ratio also includes all values and subvalues between these ranges.

The graphene sheets may contain atomic scale kinks due to the presence of lattice defects in the honeycomb structure of the graphite basal plane. These kinks can be desirable to prevent the stacking of the single sheets back to graphite oxide and/or other graphite structures under the influence of van der Waals forces.

The polymer used in the compositions used in the present invention can be at least one thermoplastic and/or thermoset polymer. Preferred polymers are thermoplastics. Examples of thermoplastics include, but are not limited to poly(phenylene oxide) (PPO), PPO-polyamide alloys, polysulphones (PSU), polyetherketones (PEK), polyetheretherketones (PEEK), polyolefins (including polyethylene, polypropylene, olefin copolymers, block copolymers (such as styrene-isoprene-styrene and styrene-butylene-styrene polymers, and the like), ethylene/vinyl alcohol (EVOH) copolymers polyimides, polyoxymethylenes (POM), polyetherimides, fluoropolymers, fluorinated ethylene propylene polymers (FEP), poly(vinyl fluoride), poly(vinylidene fluoride), poly(vinylidene chloride), poly(vinyl chloride), acrylonitrile/butadiene/styrene (ABS), styrene/acrylonitrile polymers (SAN), polystyrene (including high impact polystyrene), poly(acrylonitrile), polycarbonates (PC), polyamides (including, but not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylene adipamide) (polyamide MXD,6) and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, and the polyamide of hexamethyleneterephthalamide, and 2-methylpentamethyleneterephthalamide), polyesters (such as poly(butylene terephthalate) (PBT), poly(ethylene terephthalate) (PET), poly(1,3-propylene terephthalate) (PPT), poly(ethylene naphthalate) (PEN), and poly(cyclohexanedimethanol terephthalate) (PCT)), liquid crystalline polymers (LCP), and thermoplastic elastomers (including, but not limited to, copolyetheresters, thermoplastic polyurethanes, silicone rubbers, and fluorinated silicone rubbers). Blends, alloys, and copolymers comprising two or more of the foregoing polymers and/or other polymers may be used.

The compositions preferably comprise about 0.01 to about 20 weight percent, more about 0.1 to about 5 weight percent, and yet more preferably about 0.1 to about 3 weight percent of FGS, where the weight percentages are based on the total weight of the composition.

The compositions may further comprise electrically conductive additives other than the FGS, such as metals (including metal alloys), conductive metal oxides, polymers, carbonaceous materials other than the FGS, and metal-coated materials. These components can take a variety of forms, including particles, powders, flakes, foils, needles, etc.

Examples of metals include, but are not limited to silver, copper, aluminum, platinum, palladium, nickel, chromium, gold, bronze, etc. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), etc. These materials can be coated with a variety of metals, including nickel.

Examples of electrically conductive polymers include, but are not limited to, polyacetylene, polyethylene dioxythiophene, polyaniline, polypyrrole, etc.

Examples of carbonaceous materials other than the graphene sheets include, but are not limited to, graphite (including natural, Kish, and synthetic, pyrolytic, highly oriented pyrolytic, etc. graphites), carbon black, carbon fibers and fibrils, vapor-grown carbon nanofibers, metal coated carbon fibers, carbon nanotubes (including single- and multi-walled nanotubes), activated carbon, carbon fibers, expanded graphite, expandable graphite, graphite oxide, hollow carbon spheres, carbon foams, etc.

The compositions may further comprise additional components and additives, including, but not limited to, reinforcing agents; fillers; plasticizers; impact modifiers; flame retardants; lubricants; thermal, oxidative, and/or light stabilizers; mold release agents; and colorants.

The compositions are preferably well-mixed blends in which the functionalized graphene sheets are dispersed in the polymer. They may be formed using any means known in the art. When the polymer is one or more thermoplastics, they may be made using any suitable melt-mixing method, such as using a single or twin-screw extruder, a blender, a kneader, or a Banbury mixer. In one embodiment of the invention, the compositions are melt-mixed blends wherein the non-polymeric ingredients are well-dispersed in the polymer matrix, such that the blend forms a unified whole.

In one embodiment, the compositions may be formed into the fuel system components using any suitable technique, including extrusion, ram extrusion, and compression molding. Melt-processing techniques are preferred and the compositions are preferably melt-blended mixtures. Examples of melt-processing methods include injection molding, extrusion, co-extrusion, rotational molding, blow molding, injection blow molding, thermoforming, vacuum forming, casting, overmolding, and the like. The compositions can also be applied to a substrate in the form of a film, coating, or the like to form the fuel system components. They can be applied by spraying, for example. The compositions and/or components may the in the form of a tube or pipe, molded or extruded article, film, coating, and the like.

In another embodiment, components (preferably polymeric components) formed from other materials are coated with the compositions. In these cases, the component can be coated with the composition and all of part of the composition can be covered by a another material such as by overmolding, etc. The other material can be the composition comprising graphene sheets and polymer.

Coatings will often comprise a dispersion or solution of graphene sheets, polymer, and, optionally, other components in a carrier. After they are applied to the fuel system component, the coatings may be cured by any appropriate method (such as by drying, cross-linking, thermal curing, UV light curing, laser curing, IR curing, etc.), which treatment may remove all or part of the carrier.

Coatings may be made using any suitable method, including wet or dry methods and batch, semi-continuous, and continuous methods. For example, components of the coatings, such as two or more of the graphene sheets, polymers, carriers, and/or other components may be blended by using suitable mixing, dispersing, and/or compounding techniques and apparatus, including ultrasonic devices, high-shear mixers, two-roll mills, three-roll mills, cryogenic grinding crushers, extruders, kneaders, double planetary mixers, triple planetary mixers, high pressure homogenizers, ball mills, attrition equipment, sandmills, horizontal and vertical wet grinding mills, etc.

The resulting blends may be further processed by grinding using wet or dry grinding technologies. The technologies can be continuous or discontinuous. Examples include ball mills, attrition equipment, sandmills, horizontal and vertical wet grinding mills, etc. Suitable materials for use as grinding media include metals, carbon steel, stainless steel, ceramics, stabilized ceramic media (such as yttrium stabilized zirconium oxide), PTFE, glass, tungsten carbide, etc.

After blending and/or grinding steps, additional components may be added to the coatings, including, but not limited to, binders, thickeners, viscosity modifiers, etc. The coatings may also be diluted by the addition of more carrier.

Coating compositions may optionally comprise one or more carriers in which some or all of the components are dissolved, suspended, or otherwise dispersed or carried. Examples of suitable carriers include, but are not limited to, water, distilled or synthetic isoparaffinic hydrocarbons (such Isopar® and Norpar® (both manufactured by Exxon) and Dowanol® (manufactured by Dow)), citrus terpenes and mixtures containing citrus terpenes (such as Purogen, Electron, and Positron (all manufactured by Ecolink)), limonene, aliphatic petroleum distillates, alcohols (such as methanol, ethanol, n-propanol, i-propanol, n-butanol, i-butanol, sec-butanol, tert-butanol, diacetone alcohol, butyl glycol, etc.), ketones (such as acetone, methyl ethyl ketone, cyclohexanone, i-butyl ketone, 2,6,8,trimethyl-4-nonanone etc.), esters (such as methyl acetate, ethyl acetate, n-propyl acetate, i-propyl acetate, n-butyl acetate, i-butyl acetate, carbitol acetate, etc.), glycol ethers (such as propylene glycol monomethyl ether and other propylene glycol ethers, ethylene glycol monobutyl ether and other ethylene glycol ethers, ethylene and propylene glycol ether acetates), N-methyl-2-pyrrolidone, and mixtures of two or more of the foregoing and mixtures of one or more of the foregoing with other carriers. Preferred solvents include low- or non-VOC solvents, non-hazardous air pollution solvents, and non-halogenated solvents.

The coatings may optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, cross-linking and curing agents, etc.

Examples of dispersing aids include glycol ethers (such as poly(ethylene oxide)), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate), isopropoxy titanium acetylacetonate, and others sold by Johnson-Matthey Catalysts under the trade name Vertec®.

Examples of thickening agents include glycol ethers (such as poly(ethylene oxide), block copolymers derived from ethylene oxide and propylene oxide (such as those sold under the trade name Pluronic® by BASF).

Coatings may be applied to the fuel system component using any suitable method, including, but not limited to, painting, pouring, spin casting, solution casting, dip coating, powder coating, by syringe or pipette, spray coating, curtain coating, lamination, co-extrusion, electrospray deposition, spin coating, thermal transfer (including laser transfer) methods, doctor blade printing, via pen or similar means, etc. The coatings can be applied in multiple layers.

When the fuel system components are coated, the coatings can have a variety of thicknesses. For example, after curing the coating can optionally have a thickness of at least about 100 nm, or at least about 500 nm, or at least about 1 µm, or at least about 100 µm, or at least about 500 µm, or at least about 1 mm, or at least about 2 mm, or at least about 4 mm. The coatings could have a thickness of about 100 nm to about 1 cm, or of about 500 nm to about 1 cm, or of about 1 µm to about 1 cm, or of about 1 µm to about 5 mm, or of about 1 µm to about 3 mm, or of about 1 µm to about 1 mm, or of about 1 µm to about 750 µm, or of about 1 µm to about 500 µm, or of about 1 µm to about 250 µm.

The fuel system components can be assembled from two or more polymeric parts using any method known in the art, including gluing, snap fitting, laser welding, friction welding, spin welding, ultrasonic welding, and the like.

The fuel system components may be in the form of multilayered structures comprising two or more layers. Two or more layers may comprise the composition used in the present invention. Layers other than those comprising the composition used in the present invention may comprise one material or two or more materials, such as additional polymeric materials, metals, fibers, woven materials, and the like. In one embodiment of the invention, in a multilayered system, the polymer-FGS composition used in the present invention is exposed to fuel in at least a portion of the fuel system component. In another embodiment, the composition is present in a portion of the component that is not exposed to fuel. In a further embodiment, the composition is present in portions of the component that are exposed to fuel and portions that are not exposed to fuel.

The components are preferably sufficiently electrically conductive to be static dissipative. For example, the components may have a surface resistivity of less than about $1\times10^9$ Ω/square and/or a volume resistivity of less than about $1\times10^8$ Ω·cm. The components may have a conductivity of at least about $10^{-8}$ S/m. They may have a conductivity of about $10^{-6}$ S/m to about $10^5$ S/m, or of about $10^{-5}$ S/m to about $10^5$ S/m. In other embodiments of the invention, the compositions have conductivities of at least about 0.001 S/m, of at least about 0.01 S/m, of at least about 0.1 S/m, of at least about 1 S/m, of at least about 10 S/m, of at least about 100 S/m, or at least about 1000 S/m, or at least about $10^4$ S/m, or at least about $10^5$ S/m, or at least about $10^6$ S/m.

The components may be thermally conductive and have a thermal conductivity of about 0.1 to about 50 W/(m-K), or of about 0.5 to about 30 W/(m-K), or of about 1 to about 30 W/(m-K), or of about 1 to about 20 W/(m-K), or of about 1 to about 10 W/(m-K), or of about 1 to about 5 W/(m-K), or of about 2 to about 25 W/(m-K), or of about 5 to about 25 W/(m-K). The conductivities can be measured using ASTM E1461-07 or ISO 8894-2:2007.

The invention claimed is:

1. A fuel system component, comprising a polymer composition that comprises at least one polymer and fully exfoliated single sheets of graphene, wherein the fuel system component is in direct contact with fuel or provides a path to ground from a second component that is in direct contact with flowing fuel; wherein the fully exfoliated single sheets of graphene have a carbon to oxygen molar ratio of at least 50:1; and wherein the fuel is a liquid fuel.

2. The component of claim 1, wherein the graphene sheets have a surface area of 2630 m$^2$/g.

3. The component of claim 1, having an electrical conductivity of at least about $10^{-8}$ S/m.

4. The component of claim 1, having an electrical conductivity of at least about $10^{-6}$ S/m.

5. The component of claim 1, wherein the polymer composition is present as a coating on the fuel system component.

6. The component of claim 1, wherein the polymer comprises one or more thermoplastic polymers selected from polyamides, polyesters, polyoxymethylenes, polyimides, poly(phenylene oxides), polyurethanes, and fluoropolymers.

7. The component of claim 1, in the form of fuel lines and tubing.

8. The component of claim 1, in the form of a fuel tank filler pipe, a fuel tank filler connector, a fuel line connector, a fuel pump and delivery module components, a fuel pump, a fuel delivery module component, a fuel injector component, or a fuel filter housing.

9. The component of claim 1, wherein the component comprises at least two layers, at least one of which is exposed to fuel.

10. The component of claim 9, wherein at least a portion of at least one layer exposed to fuel comprises the polymer composition.

11. The component of claim 1, wherein the composition further comprises one or more electrically conductive additives other than fully exfoliated single sheets of graphene.

12. A fuel system component, comprising a polymer composition that comprises at least one polymer and fully exfoliated single sheets of graphene, wherein the fuel system component is in direct contact with fuel or provides a path to ground from a second component that is in direct contact with flowing fuel, wherein the fully exfoliated single sheets of graphene have a X-ray diffraction pattern that displays no signature corresponding to graphite or graphite oxide; and wherein the fuel is a liquid.

13. The component of claim 12, wherein the polymer composition is present as a coating on the fuel system component.

14. The component of claim 12, having an electrical conductivity of at least about $10^{-8}$ S/m.

15. The component of claim 12, wherein the polymer comprises one or more thermoplastic polymers selected from polyamides, polyesters, polyoxymethylenes, polyimides, poly(phenylene oxides), polyurethanes, and fluoropolymers.

16. The component of claim 12, in the form of fuel lines and tubing.

17. The component of claim 12, in the form of a fuel tank filler pipe, a fuel tank filler connector, a fuel line connector, a fuel pump and delivery module components, a fuel pump, a fuel delivery module component, a fuel injector component, or a fuel filter housing.

18. The component of claim 12, wherein the component comprises at least two layers, at least one of which is exposed to fuel.

19. The component of claim 18, wherein at least a portion of at least one layer exposed to fuel comprises the polymer composition.

* * * * *